O. DIMMITT.
TIRE.
APPLICATION FILED FEB. 5, 1912.

1,072,925.

Patented Sept. 9, 1913.

WITNESSES

INVENTOR
Ora Dimmitt.
Attorney

UNITED STATES PATENT OFFICE.

ORA DIMMITT, OF GREEN CASTLE, MISSOURI.

TIRE.

1,072,925. Specification of Letters Patent. Patented Sept. 9, 1913.

Application filed February 5, 1912. Serial No. 675,680.

*To all whom it may concern:*

Be it known that I, ORA DIMMITT, a citizen of the United States, residing at Green Castle, in the county of Sullivan and State of Missouri, have invented certain new and useful Improvements in Tires; and I do hereby declare the following to be a full, clear, and exact description of the invention, such as will enable others skilled in the art to which it appertains to make and use the same.

This invention relates to tires, and has for its object to provide a substitute for the pneumatic tires now in use, at the same time retain the resiliency thereof, and increase the general strength and wearing qualities.

Among the other objects of the present invention is to eliminate entirely the necessity of inflating a tire, and to further provide a means for adjusting the resiliency thereof.

With the above and other objects in view, this invention consists in the construction, combination, and arrangement of parts all as hereinafter more fully described, claimed and illustrated in the accompanying drawings.

Figure 1:
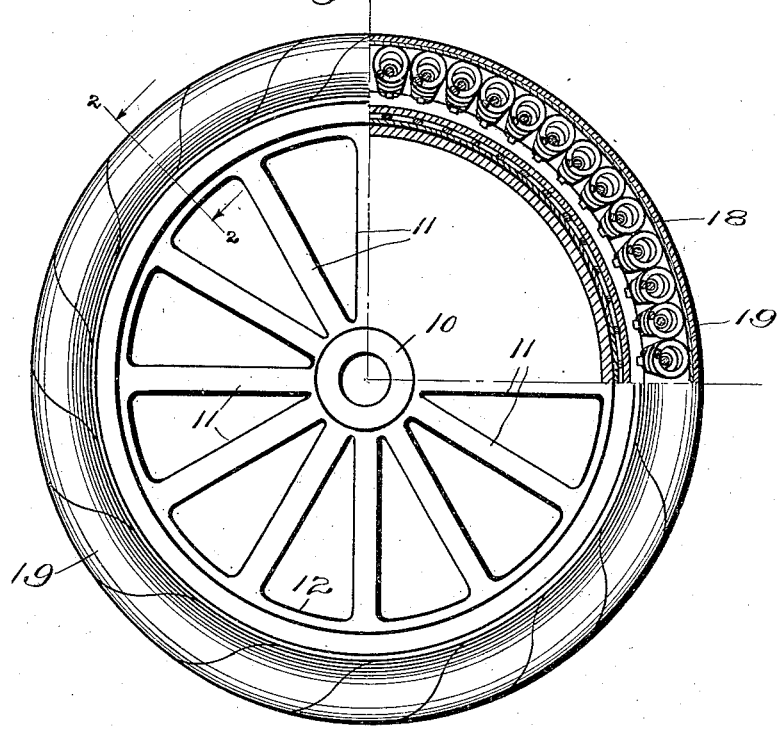
Figure 2:
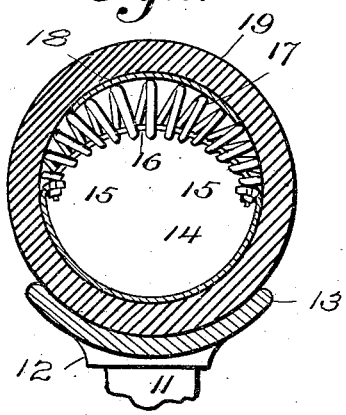
Figure 3:
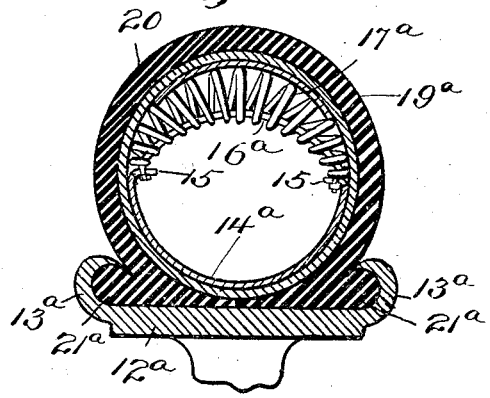

Figure 1 is a side elevation of a wheel provided with the tire forming the subject matter of the present invention, a quadrant thereof being broken away for the purposes of illustration. Fig. 2 is a transverse section taken along line 2—2 of Fig. 1. Fig. 3 is a similar view illustrating a modification, thereof.

Reference being had more particularly to the drawings, 10 indicates the hub of any standard wheel provided with the radiating spokes 11, which carry, at their terminals the rim or felly 12. This rim or felly is provided on each side thereof, with a peripherally disposed flange 13 which is adapted to engage the sides of the tire as hereinafter more fully described.

The tire forming the subject matter of the present invention comprises a concave plate 14 which is bent upon itself to form a tire of circular cross-section and is adapted to be retained by the flanges 13, said plate constituting a secondary rim. The edges of the plate 14 are provided with a plurality of notches or recesses 15 in which are retained the terminals of the U bolts 16. The nuts of said U bolts operate against the inner surfaces of the flange 14. Each one of these bolts 16 carries a spring 17 of the lenticular construction, that is, the diameter of said spring decreases toward the terminals thereof. These springs are bent to conform with the construction of the U bolts, and the terminals thereof are adapted to rest upon the edges of the plate 14. In this manner the outer side of the coils of the spring rest in the circumference of the same circle, thereby presenting a smooth tread.

In order to cover the springs which comprise the resiliency of the tire to form a substitute for the air now in use, a strip of leather 18 is placed transversely upon the springs 17 and extends completely around the tire upon the bearing surface thereof. A continuous strip of rubber, leather or other material 19 is then wound about the plate 14, the springs 17, and the strip of leather 18 which thereby constitutes the casing of the tire. By here referring to Fig. 2 it will clearly be seen that this entire construction is placed upon the flanges 13 thereby retaining the same in place. It will further be understood that by the provision of the U bolts, the tension of the springs 17 may be varied at the same time retaining the outer sides thereof in their normal alinement. Should the covering 19 become worn or damaged the same can be removed or be replaced with little or no cost other than the material used in this operation.

Referring to the modification illustrated in Fig. 3, the wheel is constructed identically with the wheel illustrated in Figs. 1 and 2, with the exception that the felly $12^a$ thereof is provided with clencher flanges $13^a$, said clencher flanges being adapted to readily secure the tire in its operative position. A plate $14^a$, constructed identically with the plate 14 of the preferred form is mounted in the usual manner upon the felly $12^a$ and carries U bolts $16^a$ which secure lenticular springs $17^a$ to the plate $14^a$. The springs $17^a$ and the plate $14^a$ are incased by a winding $19^a$ similar to the winding 19 in the preferred form, said winding constituting an inner covering for the springs. The shoe or outer tire 20, constructed of rubber or other suitable material in the usual manner, incases the entire construction and secures the same to the felly by means of flanges $21^a$, which are engaged by the clenchers $13^a$.

Should the weight upon the tire be great enough to force the outer portions of the convolutions of the springs against the arch members 16, the latter will take up the strain and because of their construction, give to a certain extent. It will thus be seen that these members or bolts 16 serve not only to retain the springs in proper operative position but also in time of undue pressure, assist in producing a resilient tire.

Having thus fully described my invention, what I claim as new, and desire to secure by U. S. Letters Patent, is:—

A tire of the character described, comprising a continuous annular plate, said plate being concavo-convex in cross section, the edges of said plate being bent inwardly and slotted, a plurality of outwardly arched rods having their ends extended through said slots, means for securing said rods in position, a plurality of lenticular spiral springs surrounding said rods and bearing at their ends on the inturned edges of the plate, and a casing inclosing the beforementioned parts, the arched rods yielding under pressure and coöperating with said springs to produce a resilient tire.

In testimony whereof I affix my signature in presence of two witnesses.

ORA DIMMITT.

Witnesses:
J. S. BAILEY,
H. S. BAILEY.

Copies of this patent may be obtained for five cents each, by addressing the "Commissioner of Patents, Washington, D. C."